United States Patent [19]

Bailey

[11] Patent Number: 5,156,506
[45] Date of Patent: Oct. 20, 1992

[54] LOG TRUCK SECUREMENT SYSTEM

[75] Inventor: Warner Bailey, Wells, Tex.

[73] Assignee: Greenhead Industries, Wells, Tex.

[21] Appl. No.: 622,161

[22] Filed: Nov. 30, 1990

Related U.S. Application Data

[63] Continuation-in-part of Ser. No. 547,673, Jul. 2, 1990, abandoned.

[51] Int. Cl.⁵ .............................................. A44B 21/00
[52] U.S. Cl. ................................... 410/100; 410/103; 24/68 R; 24/71.2; 24/68 CD
[58] Field of Search ................ 410/12, 10, 11, 20–23, 410/96–116; 24/68 CD, 265 CD, 71.2, 68 R

[56] References Cited

U.S. PATENT DOCUMENTS

| Re. 30,307 | 6/1980 | Arbogast . | |
|---|---|---|---|
| 1,564,537 | 12/1925 | Dellb | 24/68 CD |
| 2,442,266 | 5/1948 | Davis . | |
| 2,623,760 | 12/1952 | Fornelius . | |
| 2,679,670 | 6/1954 | Griswold . | |
| 2,919,895 | 1/1960 | Johnson | 24/68 CD |
| 2,991,975 | 7/1961 | Alexander . | |
| 2,998,625 | 9/1961 | Huber . | |
| 3,077,791 | 2/1963 | Gray . | |
| 3,377,044 | 4/1968 | Jackson . | |
| 3,428,331 | 2/1969 | Morgan et al. | 410/100 |
| 3,753,407 | 8/1973 | Tilseth . | |
| 3,848,889 | 11/1974 | Sharrow | 410/103 |
| 3,942,750 | 3/1976 | Noorily | 24/16 PB X |
| 4,054,267 | 10/1977 | Berg et al. . | |
| 4,063,712 | 12/1977 | Arbogast . | |
| 4,126,095 | 11/1978 | Tillery | 410/96 |
| 4,227,286 | 10/1980 | Holmberg | 410/103 X |
| 4,234,166 | 11/1980 | Cederblad | 24/68 CD |
| 4,243,350 | 1/1981 | Hall . | |
| 4,297,062 | 10/1981 | Sauber . | |
| 4,428,099 | 1/1984 | Richmond | 410/103 X |
| 4,823,443 | 4/1989 | Waters | 24/71.2 X |
| 4,900,203 | 2/1990 | Pope | 410/100 X |
| 4,957,400 | 9/1990 | Karp | 410/110 |
| 4,964,771 | 10/1990 | Callihan | 410/103 X |

FOREIGN PATENT DOCUMENTS 1281518  7/1972  United Kingdom ................ 410/100

Primary Examiner—Robert J. Spar
Assistant Examiner—William M. Hienz
Attorney, Agent, or Firm—Pravel, Gambrell, Hewitt, Kimball & Krieger

[57] ABSTRACT

A load tie-down and arrangement for securing loads onto vehicles, particularly non-uniform and abrasive loads such as logs onto log-hauling trailers, and for enhancing the safety with which such loads can be transported. The tie-down includes a high abrasion resistant webbing capable of being attached at one end to the vehicle and at the other to a winching mechanism. The winching mechanism easily accommodates excess webbing for small load situations and is capable of being easily and quickly tightened or retightened during transport to offset any slack in the webbing which may have been created due to load shifting or settling. A modified tie-down can be used to encircle the load without attachment to the vehicle for increased security.

14 Claims, 3 Drawing Sheets

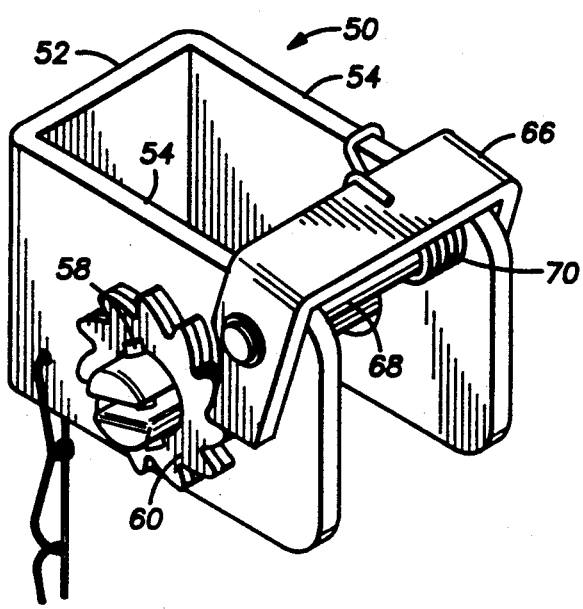
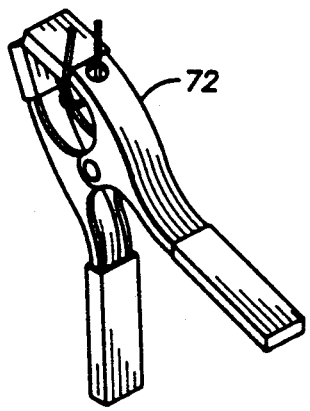
FIG. 4
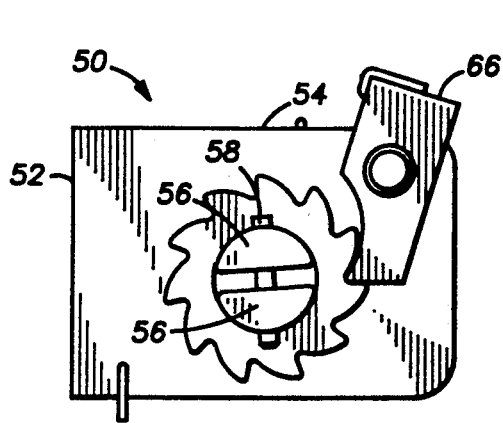
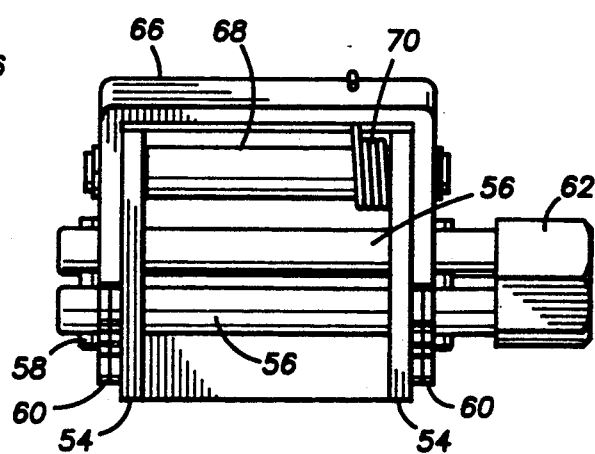
FIG. 5  FIG. 6

LOG TRUCK SECUREMENT SYSTEM

This is a continuation-in-part of co-pending application Ser. No. 07/547,673 filed Jul. 2, 1990, now abandoned.

BACKGROUND OF THE INVENTION

1. Field of the invention

This invention relates to a load tie-down or securement system and, more particularly, to an improved log haulers securement system which can be used to better secure non-uniform, abrasive loads such as logs, for transport via a trailer.

2. Description of the prior art

There is an acute need in the log-hauling industry for an improved system of securing loads of logs onto trailers for transport from the forests where such logs are first cut from live trees to the mills where the logs are processed into lumber or other related forestry products.

A load of logs typically consists of individual logs which are, within certain limits, non-uniform in diameter and in length. Unlike most manufactured items, a load of logs usually includes individual logs having diameters which are larger at one end than at the other. Furthermore, each individual log is itself non-uniform, apart from the lower portions of the log being larger than the upper portions. Most logs feature larger diameters at locations along the log where branches were formerly attached.

In addition to the non-uniformity, logs are also relatively abrasive, making it impractical to use standard webbing or strapping binding materials to secure such loads. Webbing or other straps of woven or braided material is widely used in the transportation industry for securing loads which are more uniform and less abrasive than logs. Examples of a few such applications can be found in U.S. Pat. Nos. 2,442,266, 2,623,760, 2,679,670, 2,998,625, 3,377,044, 4,054,267, 4,243,350 and 4,297,062.

Because logs tend to be highly abrasive, the predominant binding material in the log hauling industry has for years been chains and in some cases cables, or a combination of chain and cable, known as wire rope. Examples of the use of cables can be seen in U.S. Pat. Nos. 2,991,975 and 3,077,791, and in U.S. Pat. No. Re. 30,307.

The vast majority of log trucks currently use chains to secure the load. One or more chains is first thrown over the load. A boomer, or load binder, which is essentially a lever device, is then used to tightly pull the chain ends to a position where the chain is firmly grasping the load of logs.

Because of the lack of uniformity of logs, and because of their large weight, loads of logs tend to shift and settle during transport from the forest to the mill. When shifting or settling occurs, the chain is often loosened, typically by four inches or more. This loosening of the chain can often cause the boomer, or load binder, to become loose and allow the two ends of the chain to completely detach from the boomer, or load binder, causing the chain and/or the load binder to fall off the load. This leaves the load of logs unsecured and can lead to the loss of some or all of the logs onto the roadway.

The loss of a load of logs leads to large economic penalties. Even more importantly, logs falling off a trailer onto the roadway severely threatens the safety of the motoring public sharing the public roads with the log trucks.

The recurrent problems associated with a partial loss of loads of logs from trailers has created an urgent need for more effective systems for securely binding loads of logs onto trailers for transportation from the forests to the mills.

The prevalent technique is the chain and load binder method described above. Attempts have been made to overcome the shortcomings inherent in that system described above. Several methods use a cable instead of a chain. Use of a cable makes it possible to use a winch mechanism for easier tightening. Typical of such system are those described in U.S. Pat. Nos. 2,991,975 and 3,077,791, and U.S. Pat. No. Re. 30,307. These references all disclose similar methods which employ a special winch for automatically taking up at least some of the slack in the cable created when the logs settle during transport.

While this type of mechanism appears to be an improvement over the chain and load binder system, it is largely inadequate. In particular, it would appear that the amount of slack cable which can automatically be taken up is insufficient to tighten the cable. In addition, the devices disclosed would be incapable of exerting sufficient force to adequately tighten a cable which has become slack around a load of heavy logs. These deficiencies may explain why such devices have not been used commercially in the log transportation industry.

A shortcoming of the presently widely used system of securement using a chain and load binder is that the chain is susceptible to loosening and falling off the load, making it easier for the load, as well as the boomer and chain, to fall off the truck and endanger the safety of motorists. Attempts to improve this system with the use of cables and winches capable of automatically tightening the slackened cable have to date been commercially unsuccessful.

It would thus be desirable to have a securement system for use in tying down loads which are non-uniform and abrasive, such as logs, which (1) would eliminate the use of chains and load binders which are prone to loosening and falling off the load, (2) would securely bind a load of logs and continue to contain the load even after the load has shifted or settled, (3) would be easy to use, and (4) would readily facilitate retightening to take up slack created upon settling of the load. A clear need exists in the industry for such a safe and convenient securement system.

SUMMARY OF THE INVENTION

This invention successfully addresses the shortcomings of the presently known log truck securement systems by providing a system which uses special high abrasive resistant webbing and specially adapted winches to tie down loads and to facilitate retightening as the load settles.

This invention discloses a novel way of securing a load of non-uniform and abrasive items such as logs. The system would typically involve three separate tie-downs although fewer or more tie-downs could also be effectively used. Two of the tie-downs would be near the front and back ends of the trailer, while the third would be at an intermediate point near the center of the trailer.

The front and back tie-downs each consists of an abrasion-resistant webbing fastened to on side of the truck chassis or to a bolster. The other end of the webbing is placed across the top of the load and attached to a specially adapted winch device, firmly mounted to the truck chassis or bolster at the side opposite the side to which the first end of the webbing is attached. The winch is used to tighten the tie-down with the aid of a tool. A spring loaded ratchet mechanism prevents the winch from rotating in the direction so as to loosen the webbing.

The central tie-down is similar to the front and back tie-downs. In one embodiment, the central tie-down winch is firmly mounted to the pole of the pole trailer. In an alternative embodiment of the central tie-down, neither the winch nor the webbing is attached to the trailer. Instead, one end of the webbing is permanently attached to a non-rotating portion of the winch. The winch itself is modified through the addition of a firmly attached elongated metal frame portion for use in inserting the winch between two adjoining logs and thus temporarily holding the winch in place prior to the attachment of the loose ends of the webbing to the winch.

BRIEF DESCRIPTION OF THE DRAWINGS

The above and other embodiments of the present invention may be more fully understood from the following detailed description, when taken together with the lo accompanying drawing wherein similar reference characters refer to similar elements throughout, and in which:

FIG. 4 is perspective view of the winch;

FIG. 5 is a view of one side of the winch;

FIG. 6 is a head-on view of the winch;

DESCRIPTION OF THE PREFERRED EMBODIMENTS

The present invention for an improved securement system can be used to secure loads, especially loads which are irregular and abrasive, to special purpose vehicles. Specifically, this invention can be used to secure loads of poles or logs onto various types of log-hauling trailers. The securement system of this invention can, of course, be used for the securement of loads which are more uniform and less abrasive, such as pipes or cut lumber.

Figure 1:
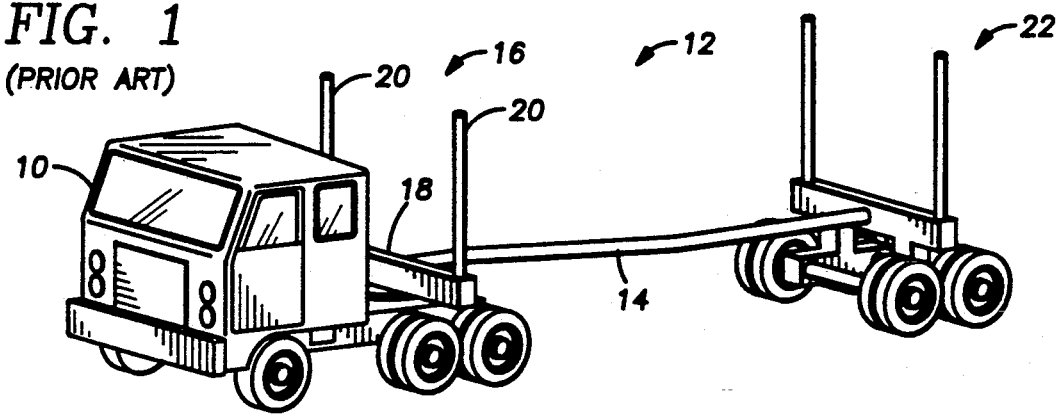
FIG. 1 is a perspective view of a typical log hauling truck and pole trailer showing the bolsters and the pole.

Referring now to the drawing, FIG. 1 illustrates an unloaded pole truck and trailer which is the most commonly used means of transporting logs from the forest to the mill. The truck 10 is any suitable truck. The trailer, designated generally as 12, is known in the industry as a pole trailer. A pole 14 serves to connect the front and back portions of the trailer. Near the front of the trailer is a U-shaped rigid structure, known as a bolster 16. The bolster 16 consists of a base member 18 and two upright or vertical members 20 attached to the base member 18 near its ends. A similar bolster 22 is found near the rear end of the trailer.

Another type of trailer, not shown in the drawing, which can be found in widespread use is what is known in the industry as a set-out trailer. A set-out trailer has a rigid flat chassis rather than a pole and features four bolsters instead of two. In some instances, up to eight bolsters are used. This is usually done to accommodate particularly long logs or two or more sets of shorter logs. The set-out trailer is somewhat sturdier than the pole trailer but cannot be as easily transported when unloaded.

To one ordinarily skilled in the art it will be apparent that the securement system of the present invention is not limited to pole trailer or a set-out trailer. Nor is the present invention limited to use in the securement of poles or logs. Rather, the securement of the present invention is applicable to a wide variety of special-purpose vehicles, transporting special loads, i.e., loads which, because of their size, shape, or weight, must be carried on special-purpose vehicles or must be fastened by special methods.

An unloaded pole trailer can be easily transported by first allowing the pole, which is made of two hinged portions, to fold back on itself, thus bringing the rear bolster and associated wheels up and over the rear wheels of the truck. The folding of the pole makes for a much shorter and more compact trailer and facilitates the transport of the empty trailer back to the forest to load additional logs.

The folded pole and rear assembly can be secured by the same method used to secure the logs to the front bolster, slightly modified in that the webbing is secured to a safety hook or latch on the passenger side of the truck and the winch is securely attached to the truck on the driver side. This configuration allows the webbing to be placed over the top member of the folded pole.

The present invention for an improved securement system is equally applicable to pole trailers and to set-out trailers. For convenience, in what follows, only pole trailers will be mentioned.

Figure 2:
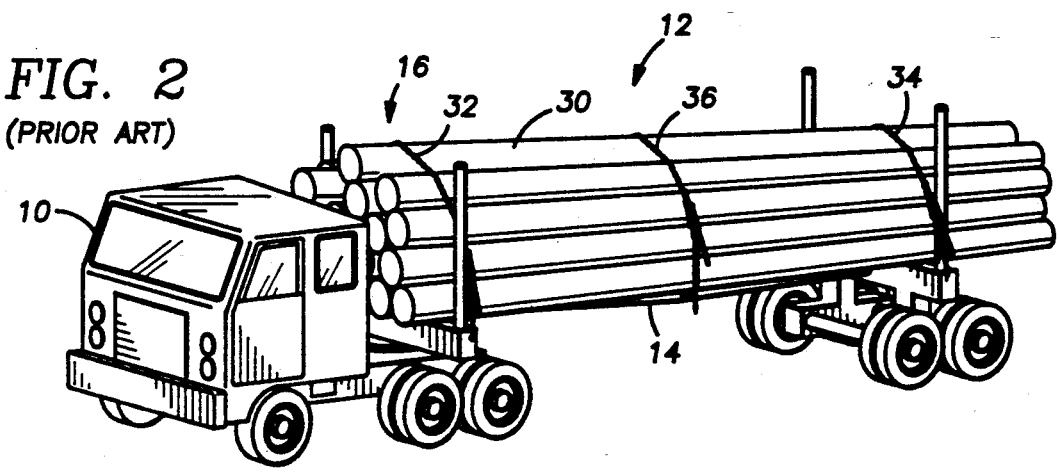
FIG. 2 is a perspective view of a typical log hauling truck and pole trailer of FIG. 1 loaded with logs.

Referring now to FIG. 2, logs 30 are loaded onto the trailer 12 so as to lie parallel to the pole 14. Once the load is ready for transport, a number of chains are used to secure the load onto the trailer 12. Chains are used because most commonly available webbing materials lack adequately abrasion resistance to withstand the abrasion caused by the logs. The tie-down arrangement shown in FIG. 2 is typical. One chain 32 is anchored at the front bolster 16. Another chain 34 is anchored at the rear bolster 22. A third chain 36 is typically used at a location intermediate between the two bolsters.

Figure 3:
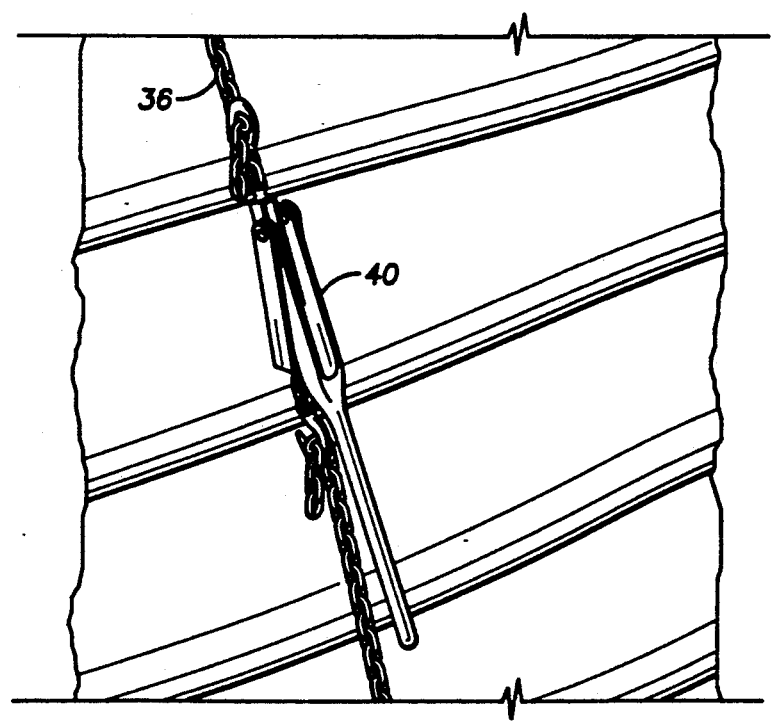
FIG. 3 is a close-up view of the commonly used binding means using chain and load binder for securing logs for transport.
Figure 7:
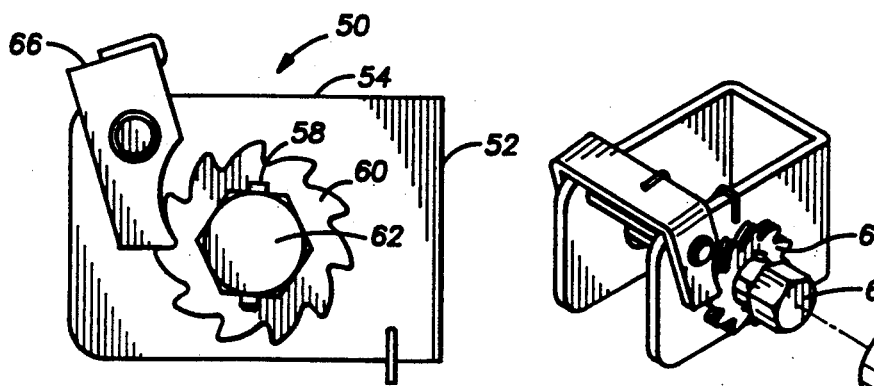
FIG. 7 is a view of the other side of the winch.
Figure 9:
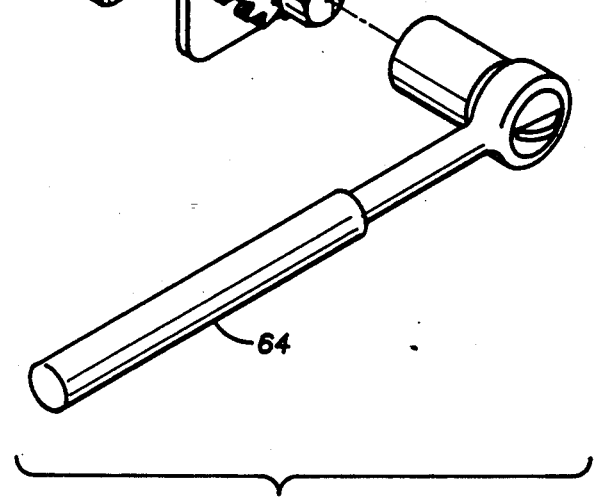
FIG. 9 is a view of the winch and the ratchet tool.
Figure 8:
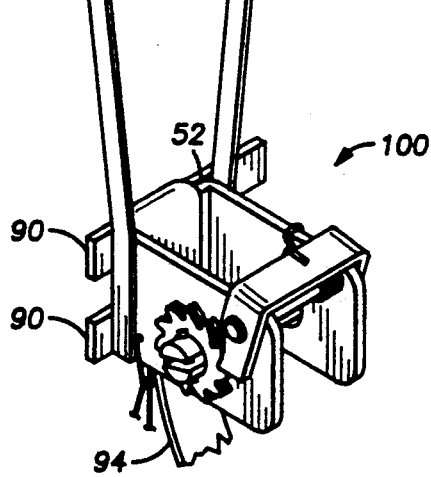
FIG. 8 is a view of the winch as modified, in one embodiment, for use at an intermediate location between the bolsters.
Figure 10:
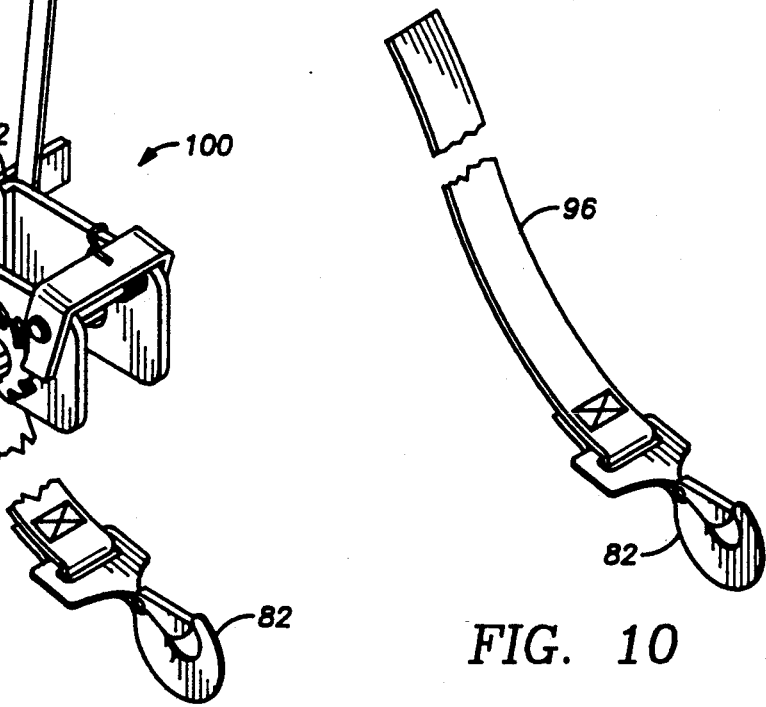
FIG. 10 is view of one of the webbing straps.

Referring now to FIG. 3, which shows a close-up view of the central portion of the load featured in FIG 2, each of the three chains is typically secured using a load binder, or boomer 40. To tighten the chain 36, the two ends of the chain are brought within close proximity of each other. The boomer 40, operating as a lever mechanism, is then used to link the two ends of the chain and tighten and secure the tie-down.

Difficulties arise because of the non-uniformity of the logs. The load tends to shift and settle during transport. The amount of slack introduced during transport can typically be on the order of 4 inches or more. Once slack has been introduced, it is relatively easy for the load binder 40 to disengage from the chain. This can cause the chain and boomer, or load binder, to fall completely off the load, leaving the load unsecured except for the partial restraining influence of the bolsters. With the load left unsecured by the chains, any acceleration of the trailer, such as would be caused by braking, increasing forward velocity, turning, or going over bumps or depressions in the roadway, could cause one or more of the logs to slide forward or backward and fall off the trailer and onto the truck cabin or the roadway. The dangers inherent in such an occurrence are readily apparent.

The present invention is of an improved securement system which makes it impossible for the tie-down to fall off the load and thus makes it much less likely that logs will fall off the trailer during transport. Rather than using metal chains, the system of the present invention calls for using an abrasion-resistant webbing. Instead of relying on a load binder, the system of the present invention uses a winch mechanism which securely holds the load under any conditions and which can be easily and conveniently used to retighten the tie-down as slack is created through load shifting and settling.

The tie-downs of this invention can be deployed at any convenient location along the trailer. Typically, one could use the same locations as are used in the standard chain tie-down shown in FIG. 2, namely, at the front and rear bolsters and at a point intermediate between the front and rear bolsters.

The tie-down is made of a webbing material specifically selected to withstand the high abrasiveness of logs. Standard polyester, having webbing strengths on the order of 5,000 lbs per inch of width, which is currently in widespread use for flat-bed trailer tie-downs of non-abrasive loads, is inadequate for purposes of securing loads of logs, especially of the highly abrasive hardwoods and pines.

It is preferred to use special winch straps, such as resin-coated plastics, like polyester, especially cordura-jacketed polyester, made by Narricot Industries, Inc., or other suitable web manufacturers. Any appropriate webbing width can be used, 2 to 4 inches is preferred, 2 inches is most preferred.

Each of the tie-downs includes a winch mechanism such as the one shown in different views in FIGS. 4, 5, 6 and 7. The winch, designated generally as 50, consists of a back plate 52, and two side plates 54. The three plates can be made of a single piece of metal or can be manufactured by connecting three separate plates. Mounted in parallel between the side plates 54 and extending beyond the side plates 54 are two metal bars 56. The metal bars are connected to each other by a pair of pins 58 located outside the side plates 54. Just outside each of the two side plates 54, the two bars 56 run through a ratchet wheel 60. Firmly attached to the two bars 56 outside one of the side plates 54 is a hexagonal shaped member 62 which can accommodate a ratchet tool 64 used in turning the pair of bars 56 during tightening of the tie-down.

A quick release bar 66 is pivotally mounted onto a pivot bar 68 running between the two side plates 54. Arranged on the pivot bar 68 is a spring 70 which serves to force the leading edge of the quick release bar 66 into contact with the ratchet wheels 60 so as to prevent the pair of bars 56 from rotating in a direction which work to loosen the webbing. The ratchet wheel is so arranged that rotation of the bars 56 in one direction is readily effected by applying force to the hexagonal shaped member 62.

The winch mechanism 50 described above can be used for each of the three tie-downs. Each of the three winches would be permanently attached to a structural member of the pole trailer. The winches for use at the front and rear bolsters position would each be permanently attached, such as, for example, by welding, preferably to either the inside or outside of each bolster at a point where the arm is connected to the bolster base bar. The winch for use at the intermediate position would be permanently attached such as, for example, by welding, to the pole at a point conveniently located approximately midway between the front and rear bolsters. The precise location of the intermediate winch would be determined by the configuration of the particular pole trailer and the typical lengths of logs to be hauled. In an alternative embodiment, the winch for use in conjunction with the intermediate tie-down is not permanently attached to the pole trailer and requires a number of modifications are described below.

One end of the webbing is adapted to firmly hold a ring, not shown, preferably permanently sewn onto the end of the webbing strap. The ring is capable of engaging a safety latch mechanism designed so that once the ring has been attached to the safety latch mechanism, the ring could not be detached without the active intervention of an operator, such as by depressing the spring-loaded safety latch mechanism. Alternatively, the ring, not shown, could be permanently attached to the vehicle while the webbing strap 96 could have a safety latch mechanism 82 permanently sewn onto one of its ends. The other end of the webbing is free of any devices and capable of being inserted into the winch mechanism.

Each of the three tie-downs, including the two located at the bolsters and the intermediate tie-down, would be deployed as follows. The operator, standing on the driver's side of the trailer, adjoining the permanently installed winch 50, would, while holding the free end of the webbing, throw the other, ringed or heated end of the webbing over the load of logs to the other side of the trailer.

The ringed end of the webbing would then be attached to a safety latch mechanism permanently attached, in the case of the front and rear end tie-downs, to the bolster arm is connected to the bolster base bar. In the case of the intermediate tie-down, the safety latch mechanism would be permanently attached to the passenger side of the pole.

The free end of the webbing would then be manually run through the space between the two bars 56 of the winch 50 to remove as much slack as can be conveniently removed manually. The standard length of webbing available would be selected to comfortably accommodate the maximum load size anticipated. Whenever smaller loads are to be carried, the excess webbing will be run through the bars 56 and rolled up and tied together, for example by using a pair of spring-loaded tongs 72 which can preferably be attached to the winch, for example, by a chain. Consolidating and tying up the excess webbing ensures that such excess would not get in the way of the operation of the trailer, for example, by getting tangled in the trailer tires or wheels. Removing the excess webbing from the system in this manner ensures that the amount of webbing rolled up in the winch will not be excessive and that excessive force will not be needed to tighten the tie-downs whenever a smaller than usual load is encountered. This is a decided advantage over systems wherein one end of the binding material is permanently attached to the winch.

After the slack webbing has been manually removed from the system by manually running the webbing through the space between the two bars 56 of the winch 50, the ratchet tool 64 would be engaged on the hexagonal member 62 and manually rotated to securely tighten the tie-down. At this point the ratchet tool 64 would be removed and stored for the journey. Whenever desirable during the journey, the operator would be able to check the tightness of the tie-down, and if necessary, reinsert the ratchet tool 64 on the hexagonal member 62 and tighten the tie-down so as to remove the slack which had been created due to the shifting and settling of the load. The ratchet tool 64 is preferably designed such that only movement in one of the two possible directions serves to tighten the winch. Rather than requiring circular motion, tightening can be accomplished by a series of short strokes in the same direction without disengaging the ratchet tool 64 from the hexagonally shaped member 62 until the tightening has been completed. Such retightening is considerably easier than retightening a chain and boomer tie-down, especially when the chain has come completely off the load.

Since the webbing of the present invention cannot come completely off the load, tightening is extremely easy and thus the operator will be motivated to stop the truck periodically and check for slackness in the webbing and quickly and easily retighten the tie-downs if any slack is found.

In an alternative embodiment, the intermediate tie-down winch is not permanently attached to the pole trailer. The basic mechanism for the intermediate winch 100 of the alternative embodiment is as described above. The following modifications are required. Permanently attached to the back plate 52 of the winch are two bars 90. Also permanently attached to one side of the winch is a metal frame 92. Finally, permanently attached to one side of the winch is the webbing 94 with a safety latch hook 82 secured at its end away from the winch. The purpose of these modifications will become clear from a description of the deployment of the intermediate tie-down.

Since the winch of the intermediate tie-down according to the alternative embodiment is not permanently attached, it would have to be stored during periods of nonuse. The metal frame 92 is preferably so shaped as to facilitate the storing of the rolled-up webbing associated with the intermediate tie-down without allowing the wound-up webbing to fall off the frame.

To deploy the intermediate tie-down according to the alternative embodiment, the operator would take the winch 100, complete with the permanently attached metal frame 92 and bars 90 from their storage location. He would then remove the webbing from the metal frame 92. Next, the operator would insert the metal frame between two logs at a convenient location. This would have the effect of temporarily suspending the winch mechanism 100 at a convenient location, enabling the operator to complete the securement of the load. The operator, while grasping the loose end of the webbing so as to ensure that it will not be thrown over the load, would proceed to throw the ringed end of the webbing over the load to the other side. From the other side, the operator would throw the ringed end of the webbing under the load, but above the pole, to the side of the load onto which the winch had been temporarily mounted.

At this point the operator would engage the ringed end of the webbing to the safety latch mechanism 82 which is permanently attached to a short span of webbing, which, in turn, is permanently attached to the winch 100. The operator would then pass the loose end of the webbing through the slot in the winch so as to remove excess webbing. When this has been accomplished, the operator would disengage metal frame 92 from its location between the logs and Would position the winch 100 according to the alternative embodiment against the load so that the bars 90 and metal frame 92 are parallel to the logs. The balance of the excess webbing would then be removed, the webbing would be manually tightened, and final tightening would be accomplished as in the case of the front and rear tie-downs.

The two bars 90 of the intermediate winch 100 serve to stabilize the winch 100 according to the alternative embodiment during the tightening process by countering the torque placed on the device though the use of the ratchet tool 64. Additionally the bars 90 serve to protect the webbing from abrasion by the logs at the back of the winch 100. In yet another alternative embodiment, not shown, the two bars 90 are oriented so as to be roughly parallel to the two arms of the metal frame. In addition, the two bars 90 are each provided with points so as to be able to pierce into and hold onto the adjoining logs to secure the winch 100 during tightening with the ratchet tool 64.

The securement system according to the present invention leads to enhanced safety on the roads, and is, in addition, easy to use and operate. To demonstrate the ease of use of the securement system of this invention clear, the following describes one possible method of deploying the system on a pole trailer, using two bolster tie-downs and a single intermediate tie-down.

For purposes of description, the driver's side of the trailer will be designated "D" while the passenger side will be designated "P". Typically, a safety latch mechanism will be permanently installed to each of the P side bolster arms at a point near where each arm meets the corresponding base bar of the bolster. A winch as described above will be permanently attached in a comparable positions on the D side bolster arms.

Once the trailer has been loaded with logs, the operator, typically the truck driver, would take the items needed to secure the load, namely, three sets of webbing, the intermediate winch with its attached short span of webbing and safety latch, and the ratchet tool.

The operator would begin on the D side near the front bolster where a winch had been permanently installed, by throwing the ringed end of the webbing of one of the webbing sets over the load to the P side while holding the loose end of the webbing to ensure that the loose end stays in the vicinity of the front bolster winch.

The operator would then walk to an intermediate point on the D side, where a winch had been permanently installed on the pole, and throw the ringed end of the webbing of one of the webbing sets over the load to the P side while holding the loose end of the webbing to ensure that the loose end stays in the vicinity of the intermediate bolster winch.

In the alternative embodiment, wherein the intermediate winch is not permanently attached to the pole, the operator, after arriving at the intermediate location, would unwind the webbing from the frame attached to the intermediate winch, and insert the metal frame of the intermediate winch according to the alternative embodiment at a convenient location between two logs. He would then throw the ringed end of the webbing over the load to the P side.

In either case, the operator would then continue walking on the D side to the rear bolster where a winch had been permanently installed, where he would throw the ringed end of the webbing of the third webbing sets over the load to the P side while holding the loose end of the webbing to ensure that the loose end stays in the vicinity of the rear bolster winch.

The operator would then walk around the rear of the trailer to the rear P side bolster where he would grasp the ringed end of the webbing and, after aligning the strap somewhat, attach the ringed end of the webbing to the permanently installed rear safety latch mechanism.

The operator would then proceed to approximately the middle of the P side and would attach the ringed end of the intermediate webbing to the intermediate safety latch mechanism permanently attached the P side of the pole.

In the alternative embodiment, the operator, after arriving at the intermediate location on the P side, would throw the ringed end of the webbing under the load, but above the pole, back to the D side.

In either case, the operator would next step to the front bolster on the P side and proceed to engage the hooked end of the webbing to the front bolster safety latch mechanism just as he did in the case of the rear tie-down.

The operator would then walk around the front of the truck back to the front of the D side of the trailer. He would grasp the loose end of the webbing and pull the excess webbing through the slot in the winch, exerting normal manual pressure. While holding the webbing taut, the operator would then engage the ratchet tool and tighten the front tie-down completely. He would then remove the ratchet tool. The operator would then tie the excess webbing so that it does not interfere with operations.

The operator would then step to the intermediate location on the D side and proceed to secure the intermediate tie-down precisely as in the case of the front tie-down.

In the alternative embodiment, the operator, after arriving at the intermediate location on the D side, would grasp the hooked end of the intermediate webbing and hook it securely into the safety latch hook which is permanently attached to a piece of webbing, which, in turn, permanently attached to the specially modified intermediate winch. The operator would then take the loose end of the webbing and proceed to secure it just as he had done before in the case of the front and rear tie-downs, except that the would disengage the metal frame from the logs immediately after insertion of the loose webbing into the winch and prior to tightening.

In either case, the operator would then step to the rear bolster on the D side and proceed to secure the rear tie-down precisely as in the case of the front tie-down. This would complete the deployment of the securement system rendering the load ready to be transported.

In yet another embodiment the system is as described above with a small modification. In this embodiment a ring is secured to the front bolster upright pole on the P side, a second ring is secured to the rear bolster upright pole on the P side, and in the case of the alterative embodiment featuring a winch connected to the pole at an intermediate location, a third ring is secured to the pole. The safety latches are sewn directly to the web, rather than being attached to the ring as in the embodiments described above. This modification provides a number of advantages. First, a ring welded to the steel "C" channel which is, in turn, welded to the bolsters and the pole is less likely to be bent through contact with logs and equipment than a hook would be. This is because the ring protrudes to a lesser extent than would a hook. Secondly, a safety latch or hook sewn onto the web gives the web additional weight which facilitates the throwing of tie-down webbing over the load of logs in the process of tying or untying the load.

Other embodiments provided alternative means of securement can be used to accommodate the large variations of pole trailer designs. Securement through a ring or hook connected to the front and rear bolsters on the P side has been described. In the alternative configuration a larger ring or hook connected to the front and rear bolsters on the P side has been described. The P side ring must be large enough to permit the webbing to pass through it. This allows the operator, at his option, to either hook the tie-down to the ring or to insert the hooked end of the web through the larger ring and continue to pass the web under the load of logs and back to the D side where the webbing can be secured to a hook as described above.

At one or more points in the course of the journey, operator may inspect the tie-downs. This inspection may be made by stopping the truck and visually inspecting the tie-downs. Additionally, or alternatively, the operator may inspect the condition of the tie-downs by examining the winches through the side view mirror on the driver side. If slack is discovered, the operator can stop the truck and simply and quickly reengage the ratchet tool and retighten any or all of the three tie-down to the desired degree.

Upon arrival at the final destination, the operator can quickly and easily undo the tie-downs to allow the trailer to be unloaded. Such an operation might start at the front bolster on the D side. The operator would strike the quick release bar, causing the tension in the tie-down to be released. While then manually depressing the quick release bar, the operator can pull out all the webbing from the winch.

The operator can then release the webbing of the intermediate tie-down from the D side just as he did for the front tie-down. After releasing the intermediate webbing, the webbing can be pulled from the D side and collected by the operator. In the alternative embodiment the operator can proceed as above or he can drop the intermediate winch to the ground and then collect the winch from the P side by dragging the winch to with the attached webbing.

The operator can then step to the rear bolster on the D sided and release the webbing just as in the case of the front tie-down above.

Walking around the rear of the trailer to the P side, the operator can unhook the ringed end of the webbing from the safety latch at the rear bolster, pull the webbing to the P side and gather the rear webbing.

A similar procedure can be followed in the case of the intermediate tie-down. In the alternative embodiment, if he has not already collected the intermediate winch and webbing, the operator can step to the center of the P side and collect the winch and webbing.

In either case, the operator can then step to the front bolster on the P side, unhook the ringed end of the webbing from the safety latch mechanism, pull the front webbing to the P side, and collect the front webbing. At this point the load is completely free and ready to be unloaded. The three sets of webbing can be stored for future use.

It is seen that the present invention and the embodiments disclosed herein are well adapted to carry out the objectives and obtain the ends set forth at the outset. Certain changes can be made in the method without departing from the spirit and the scope of this invention. It is realized that changes are possible and it is further intended that each element recited in any of the following claims is to be understood as referring to all equivalent elements for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

To one ordinarily skilled in this art who has the benefits of this invention's teachings and disclosures, other and further objects and advantages will be clear, as well as others inherent therein, from the following description of the presently-preferred embodiments, given for the purpose of disclosure. Although these descriptions are detailed to ensure adequacy and aid understanding, this is not intended to prejudice that purpose of a patent which is to claim an invention no matter how others may later disguise it by variations in form or additions or further improvements.

This concludes the description of preferred embodiments of applicant's invention. Those skilled in the art may fine many variations and adaptations thereof, and all such variations and adaptations, falling within the true scope and spirit of applicant's invention, are intended to be covered thereby.

What is claimed is:

1. A tie-down for securing a load onto a vehicle, comprising:
   an abrasion resistant webbing strap having an anchoring end and a winching end;
   latching means permanently attached to the vehicle for securely connecting the anchoring end of the strap to the vehicle;
   anchoring means permanently attached to the anchoring end of the strap for engaging the latching means;
   winching means permanently attached to the vehicle for receiving therethrough the winching end of the strap for the purpose of tightening the strap;
   tongs means for consolidating an excess length of the winching end of the strap extending beyond the winching means; and
   means for securing the tongs means to the winching means.

2. A tie-down as in claim 1 wherein the abrasion resistant strap is made of a resin-jacketed plastic.

3. A tie-down as in claim 2 wherein the plastic is polyester.

4. A tie-down as in claim 2 wherein the plastic is resin-coated polyester.

5. A tie-down as in claim 2 wherein the abrasion resistant strap is made of a cordura-jacketed polyester.

6. A tie-down as in claim 1 wherein the latching means is a safety latch mechanism.

7. A tie-down as in claim 1 wherein the winching means comprises grasping means which allows the excess length of strap to pass through the winching means and which is capable of grasping the winching end of the strap for the purpose of tightening.

8. A tie-down as in claim 7 wherein the grasping means comprises two adjoining parallel bars forming a gap between them, the gap being of sufficient width to allow the strap to pass through the gap.

9. A tie-down as in claim 8 wherein the winching means comprises a ratchet wheel firmly attached to the parallel bars and to a quick release bar, the quick release bar being biased so as to prevent the winching means from unwinding unless the quick release bar is pushed away sufficiently to allow the ratchet wheel to turn in a direction so as to allow the strap to unwind.

10. A tie-down means as in claim 9 wherein the winching means comprises a hexagonal member firmly attached to the parallel bars and capable of being positively, engaged by a ratchet tool for the purpose of tightening.

11. A load securement system capable of securing a load onto a special purpose vehicle having a first bolster and a second bolster for supporting the load, the first and second bolsters being connected by a pole member spanning therebetween and beneath the load, the load securement system comprising first and second tie-downs for securing the load to the vehicle,
    the first tie-down comprising:
       a first abrasion resistant webbing strap having an anchoring end and a winching end;
       first hooking means for connecting the first strap to the first bolster, the first hooking means being permanently attached to the anchoring end of the first strap;
       ring means for receiving the first hooking means, the ring means being permanently attached to the first bolster; and
       first winching means permanently attached to the first bolster capable of accepting the winching end of the first strap for the purpose of tightening the first strap;
    the second tie-down comprising:
       a second abrasion resistant webbing strap having an anchoring end and a winching end;
       latching means permanently attached to the pole at a location between the first and second bolsters for connecting the anchoring end of the second strap to the pole;
       anchoring means permanently attached to the anchoring end of the second strap for engaging the latching means; and
       second winching means permanently attached to the pole at a location between the first and second bolster for accepting the winching end of the second strap for the purpose of tightening the second strap, at least one of the first and second winching means receiving therethrough the winching end of the respective strap, and having secured thereto tongs means for consolidating an excess length of the winching end of the respective strap extending beyond the at least one winching means.

12. The load securement system according to claim 11, wherein the load being secured is logs or poles of non-uniform shapes and lengths with certain of the uppermost logs or poles having a length less than the distance between the first and second bolsters such that they may be secured to the vehicle with the second strap at a location between the first and second bolsters.

13. The load securement system as in claim 11, wherein the ring means and the first winching means are attached to opposite ends of the first bolster.

14. The load securement system as in claim 11, wherein the ring means is large enough to permit the first hooking means to pass through the ring means and the first tie-down further comprises a further anchoring means permanently attached to the first bolster at a location substantially adjacent the first winching means, whereby the first hooking means and the anchoring end of the first strap pass over the load and through the ring means and then passes under the load to the further anchoring means where the first hooking means engages the further anchoring means.

* * * * *